(12) United States Patent
Silva et al.

(10) Patent No.: US 7,967,976 B2
(45) Date of Patent: Jun. 28, 2011

(54) ADSORPTION OF VANADIUM COMPOUNDS FROM FUEL OIL AND ADSORBENTS THEREOF

(75) Inventors: James Manio Silva, Clifton Park, NY (US); Grigorii Lev Soloveichik, Latham, NY (US)

(73) Assignee: General Electric Company, Schenectady, NY (US)

( * ) Notice: Subject to any disclaimer, the term of this patent is extended or adjusted under 35 U.S.C. 154(b) by 397 days.

(21) Appl. No.: 11/622,731

(22) Filed: Jan. 12, 2007

(65) Prior Publication Data

US 2008/0169221 A1 Jul. 17, 2008

(51) Int. Cl.
- C10G 17/00 (2006.01)
- C10G 25/00 (2006.01)
- B01D 15/08 (2006.01)

(52) U.S. Cl. ....... 208/252; 208/90; 208/240; 208/251 R; 208/252 R; 208/253; 208/273; 208/299; 208/301; 502/247; 502/251; 502/417; 540/145; 585/830; 585/865

(58) Field of Classification Search ............... 208/90, 208/252, 252 R, 253, 273, 299, 301, 240, 208/251 R; 502/247, 251, 417; 540/145; 585/830, 865

See application file for complete search history.

(56) References Cited

U.S. PATENT DOCUMENTS

| | | | |
|---|---|---|---|
| 2,902,442 A | | 9/1959 | Erdman |
| 2,914,458 A | * | 11/1959 | Harper .............. 208/88 |
| 3,036,968 A | | 5/1962 | Gatsis |
| 3,082,167 A | | 3/1963 | Erdman |
| 3,377,268 A | | 4/1968 | Li |
| 3,619,410 A | | 11/1971 | Gleim |
| 3,833,514 A | * | 9/1974 | Wennerberg et al. ......... 502/427 |
| 3,944,501 A | * | 3/1976 | Whitehurst et al. ......... 502/401 |
| 4,256,567 A | * | 3/1981 | Bartholic ................ 208/252 |
| RE31,039 E | * | 9/1982 | Inooka et al. ............. 502/242 |
| 4,469,588 A | | 9/1984 | Hettinger, Jr. |
| 4,486,298 A | | 12/1984 | Bowes et al. |
| 4,513,093 A | | 4/1985 | Beck et al. |
| 4,604,191 A | | 8/1986 | Fish |
| 4,618,413 A | | 10/1986 | Overfield |
| 4,643,821 A | | 2/1987 | Overfield |
| 6,372,124 B2 | | 4/2002 | Reid et al. |
| 2009/0029853 A1 | | 1/2009 | Hayashi |

FOREIGN PATENT DOCUMENTS

| | | |
|---|---|---|
| EP | 0175799 | 8/1990 |
| FR | 1335756 | 8/1963 |
| GB | 872333 | 7/1961 |
| GB | 920748 | 3/1963 |
| GB | 2030564 | 4/1980 |
| JP | 50003326 | 2/1975 |
| RU | 2017745 | 8/1994 |
| RU | 2049787 | 12/1995 |
| RU | 2100363 | 12/1997 |
| SU | 952948 | 8/1982 |
| SU | 1403082 | 6/1988 |
| WO | 2007004614 A | 7/2007 |

OTHER PUBLICATIONS

Barwise.A.J.G. and E.V.Whitehead, Separation and Structure of petroporphyrins. Physics and Chemistry of the Earth, (1956-1998), 12(Adv.Org Geochem. 1979, 181-192.

Antoshkin,A.S.Z, S.K.; Barn, V.Ya, Extraction of Metals from High-Viscosity Crudes by Industrial Carbon. Khimiya i Tekhnologiva Topliv Masel(1) 19-21.

Myagkova,C.M.A,Zh.s; Amelin,A.N., Procedure for Determination of Vanadium in Crude Oils by Ion Exchange Method. Khimiya i Tekhnologiva Topliv Masel 1976 10 55-56.

EP Search Report issued in EP Application Serial Number 08100374 on Jun. 20, 2008.

* cited by examiner

*Primary Examiner* — Prem C Singh
(74) *Attorney, Agent, or Firm* — Catherine J. Winter; GE Global Patent Operation

(57) ABSTRACT

A method for treating crude or residual fuel oil includes extracting vanadium from the fuel oil by contacting the fuel oil with an adsorbent and a solvent. The adsorbent may be modified with a compound having both acidic functionality and basic functionality. The method provides effective removal of vanadium from crude or residual fuel oil at moderate temperatures.

21 Claims, No Drawings

ADSORPTION OF VANADIUM COMPOUNDS FROM FUEL OIL AND ADSORBENTS THEREOF

FIELD OF THE INVENTION

This invention relates to methods for purifying fuel oil and more particularly, to the adsorption of vanadium from crude or residual fuel oil.

BACKGROUND OF THE INVENTION

Compared with petroleum distillates, residual fuel oil is a cheap fuel and it would be desirable to use it to fuel gas turbines. However, residual fuel oil, as well as crude oil, contains from about ten to several hundred parts per million vanadium, which is a significant contaminant. Vanadium is considered a contaminant since it has a highly deleterious corrosive effect on gas turbine components. Accordingly, it is necessary to remove vanadium from the residual fuel oil before it can be used in gas turbines.

Adsorption can be an easy and inexpensive method for removing trace contaminants from liquids. U.S. Pat. No. 4,513,093 to Beck et al. discloses a kaolin clay sorbent containing a metal additive to immobilize vanadium compounds. However, the adsorption process is operated at high temperatures (above 900° F.), which makes this approach costly and hazardous.

What is needed is a low cost and effective method for removing vanadium compounds from residual fuel oil at moderate temperatures.

SUMMARY OF THE INVENTION

In one embodiment, a method for treating crude or residual fuel oil comprises extracting vanadium from the fuel oil by contacting the fuel oil with an adsorbent and a solvent.

In another embodiment, an adsorbent for removing vanadium from crude or residual fuel oil comprises an adsorbent modified with a compound having both acidic functionality and basic functionality.

The various embodiments provide effective and low cost methods for removing vanadium from crude or residual fuel oil at moderate temperatures.

DETAILED DESCRIPTION OF THE INVENTION

The singular forms "a," "an" and "the" include plural referents unless the context clearly dictates otherwise. The endpoints of all ranges reciting the same characteristic are independently combinable and inclusive of the recited endpoint. All references are incorporated herein by reference.

The modifier "about" used in connection with a quantity is inclusive of the stated value and has the meaning dictated by the context (e.g., includes the tolerance ranges associated with measurement of the particular quantity).

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

In one embodiment, a method for treating crude or residual fuel oil comprises extracting vanadium from the fuel oil by contacting the fuel oil with an adsorbent and a solvent.

Crude oil contains a variety of organic and inorganic contaminants, such as vanadium. The term "residual fuel oil" refers to the residue from distilled crude oil and to mixtures of such residue and crude oil. Residual fuel oil can have a high vanadium content of from about 10 to about 300 ppm.

The adsorbent may be any suitable vanadium adsorption material. In another embodiment, the adsorbents comprise clay or carbon. In one embodiment, the clay may be montmorillonite clay and the carbon may be activated carbon. In another embodiment, the clay may be a calcium montmorillonite clay.

The adsorbents are used in any amount sufficient to remove vanadium from the crude or residual fuel oil. In one embodiment, the amount of adsorbent is from about 1 to about 100 percent by weight based on the weight of the fuel oil. In another embodiment, the amount of adsorbent is from about 5 to about 50 percent by weight based on the weight of the fuel oil. In another embodiment, the amount of adsorbent is from about 5 to about 30 percent by weight based on the weight of the fuel oil.

The adsorbents may be mixed with the crude or residual fuel oil and separated, such as by filtration, or the adsorbents may be added to a packed column. In one embodiment, pall rings are coated with vanadium adsorbents and the column is packed with this material. Treated fuel oil with a reduced vanadium content is recovered from the adsorbent.

The adsorbents may be modified with compounds having both acidic and basic functionality. Modified adsorbents have a greater capacity for vanadium adsorption. In one embodiment, the acidic functionality is derived from an organic acid and the basic functionality is derived from an amine. In another embodiment, the adsorbents are modified with an organic acid having aliphatic or aromatic amine functionality. In another embodiment, the organic acid is a sulfoacid. In another embodiment, the organic acid is an aromatic aminosulfonic acid or its salt. In another embodiment, the organic acid having aliphatic or aromatic amine functionality includes 2-amino toluene 5-sulfonic acid, metanilic acid (3-aminobenzenesulfonic acid), aniline-2-sulfonic acid or 2-pyridylhydroxymethane sulfonic acid.

The compounds having both acidic and basic functionality may be added to the adsorbent in an amount of from about 10 to about 100 percent by weight based on the weight of the adsorbent. In another embodiment, the modifier compound may be added to the adsorbent in an amount of from about 20 to about 90 percent by weight based on the weight of the adsorbent. In another embodiment, the modifier compound may be added to the adsorbent in an amount of from about 50 to about 90 percent by weight based on the weight of the adsorbent.

The adsorbents may be modified by mixing the adsorbent with one or more compounds having both acidic and basic functionality. The adsorbent may be dry mixed with the compound or compounds having both acidic and basic functionality. The mixture may be optionally heated and mixed under a vacuum.

The adsorbents may be activated by heating the adsorbents under vacuum to a temperature of from about 60 to about 200° C. for at least about 30 minutes.

When the adsorbents become saturated with the vanadium, the adsorbents may be regenerated, for example, by acid or solvent extraction.

The solvent may be any diluent solvent that is miscible with and unreactive toward the crude or residual fuel oil within the adsorption temperature range. In one embodiment, the solvent is a non-polar solvent. In another embodiment, the solvent may be a hydrocarbon having from 1 to 30 carbon atoms. In another embodiment, the hydrocarbon may be a saturated, linear or branched hydrocarbon. In another embodiment, the solvent may be an alkane having from 1 to 30 carbon atoms or a cycloalkane having from 3 to 30 carbon atoms. In another embodiment, the solvent is a cycloalkane having from 5 to 8 carbon atoms. In another embodiment, the solvent may be an aromatic hydrocarbon having 6 to 30 carbon atoms. In one embodiment, the solvent may be tetralin or cyclohexane.

The solvent may be added to the fuel oil before or simultaneously with the adsorbent. In one embodiment, the solvent is premixed with the fuel oil before the adsorbent is added to the fuel oil and solvent mixture. In another embodiment, the solvent and fuel oil are added simultaneously into a packed column.

The amount of solvent that may be added to the fuel oil is from about 10 to about 200 percent by weight based on the weight of the fuel oil. In another embodiment, the amount of solvent is from about 20 to about 100 percent by weight based on the weight of the fuel oil. In another embodiment, the amount of solvent is from about 20 to about 60 percent by weight based on the weight of the fuel oil.

The solvent may remain with the treated fuel oil for combustion or it may be recovered by a process and recycled. The solvent may be recovered by a process such as flash evaporation.

The adsorption may occur at room temperature or up to about 120° C. In one embodiment, the adsorption temperature is from about 25° C. to about 100° C. In another embodiment, the adsorption temperature is from about 50° C. to about 90° C.

In order that those skilled in the art will be better able to practice the present disclosure, the following examples are given by way of illustration and not by way of limitation.

EXAMPLES

Comparative Example 1

Comparative examples CE-1, CE-2 and CE-3 were prepared to show the effectiveness of a calcium montmorillonite clay (K-10, Sud-Chemie AG, CAS number 70131-50-9) in removing vanadium from fuel oil (coker gas oil). K-10 was activated by heating a weighed amount of the adsorbent in an open vial under vacuum oven at 200° C. overnight. 10 g of fuel oil was added to the vial, a stir bar was added and the vial was capped. The sample was heated to 80° C. and heated and stirred overnight (heated block on a stir plate). After cooling the mixture to about 45-50° C., the oil was filtered through glass wool and the vanadium concentration in the filtered oil was measured by inductively coupled plasma (ICP). The fuel oil initially contained 12.0 ppm vanadium.

Samples CE-1, CE-2 and CE-3 in Table 1 show that K-10 is somewhat effective in removing vanadium from fuel oil.

TABLE 1

| Sample | gm K-10 | ppm V in oil after adsorption | % V Adsorption |
|---|---|---|---|
| CE-1 | 0.23 | 12.0 | 0 |
| CE-2 | 0.48 | 11.3 | 6 |
| CE-3 | 1.01 | 10.1 | 16 |

Example 2

Samples 4-6 in Table 2 demonstrate the effectiveness of adding a diluent to the fuel oil for adsorption of vanadium. In each example, an adsorbent (K-10 or CPG carbon, which is an activated carbon from Calgon Carbon Corporation) was introduced into a vial and then activated under vacuum at 200° C. overnight. Then 8.0 grams of coker gas oil and 2.0 grams of diluent solvent (tetralin or cyclohexane) was added to the vial. A stir bar was added, the vial was capped, and the vial was heated with stirring on a hot block overnight at 80° C. After cooling the mixture to about 45-50° C., the samples were filtered over glass wool and the filtered oil was analyzed by ICP for vanadium.

TABLE 2

| Sample | Adsorbent | Adsorbent (g) | Activation Temp, °C. | Diluent solvent | ppm V in oil after adsorption | % V Adsorption |
|---|---|---|---|---|---|---|
| 4 | K-10 | 2.04 | 200 | tetralin | 4.8 | 60 |
| 5 | K-10 | 2.04 | 60 | cyclohexane | 6.8 | 43 |
| 6 | Calgon CPG | 1.91 | 200 | tetralin | 2.3 | 81 |

Example 3

In Samples 7 and 8, vanadium was adsorbed from fuel oil (coker gas oil) onto modified K-10. Samples of K-10 were modified by first weighing amounts of K-10 and 2-aminotoluene 5-sulfonic acid (ASTA). The K-10 and ATSA were dry mixed with a mortar and pestle. The dry mix was placed in a vial and dried under vacuum overnight. Then the vial was capped, placed in a dry box (nitrogen atmosphere) and 8.3 g fuel oil and a diluent was added to the vial containing the modified K-10. A stir bar was added to the vial and the vial was capped. The mixture was maintained at 80° C. overnight with agitation. After cooling the mixture to about 45-50° C., the oil was filtered through glass wool and the vanadium concentration in the filtered oil was measured by ICP. The fuel oil initially contained 12.0 ppm vanadium.

| Sample | K-10 (g) | Activation Temp, °C. | Modifier (g) | Diluent | ppm V in oil after adsorption | % V Adsorption |
|---|---|---|---|---|---|---|
| 7 | 0.43 | 60 | 0.34 gm ATSA | 2.28 gm tetralin | 3.9 | 68 |
| 8 | 0.43 | 60 | 0.38 gm ATSA | 2.01 gm cyclohexane | 3.9 | 68 |
| 4 | 2.04 | 200 | — | 2.05 gm tetralin | 4.8 | 60 |
| 5 | 2.04 | 60 | — | 2.04 gm cyclohexane | 6.85 | 43 |

Samples 7 and 8 with the modified adsorbent showed more vanadium adsorption than samples 4 and 5 from Example 2, which did not have the modified adsorbent.

While typical embodiments have been set forth for the purpose of illustration, the foregoing descriptions should not be deemed to be a limitation on the scope herein. Accordingly, various modifications, adaptations and alternatives may occur to one skilled in the art without departing from the spirit and scope herein.

Having described the invention, that which is claimed is:

1. A method for treating crude or residual fuel oil comprising extracting vanadium from the fuel oil by contacting the fuel oil with an adsorbent and a solvent at a temperature of up to about 120° C., wherein the adsorbent is modified with an aromatic aminosulfonic acid or its salt having both acidic functionality and basic functionality by dry mixing with the adsorbent.

2. The method of claim 1 wherein the adsorbent is a clay or an activated carbon.

3. The method of claim 2 wherein the adsorbent is a montmorillonite clay.

4. The method of claim 2 wherein the adsorbent is a calcium montmorillonite clay.

5. The method of claim 1 wherein the aromatic aminosufork acid is selected from the group consisting of 2-amino toluene 5-sulfonic acid, metanilic acid (3-aminobenzenesulfonic add), aniline-2-sulfonic acid and 2-pyridylhydroxymethane suifonic acid.

6. The method of claim 1 wherein the compound having both acidic and basic functionality is added to the adsorbent in an amount of from about 10 to about 100 percent by weight based on the weight of the adsorbent.

7. The method of claim 6 wherein the compound having both acidic and basic functionality is added to the adsorbent in an amount of from about 20 to about 90 percent by weight based on the weight of the adsorbent.

8. The method of claim 1 wherein the fuel oil is mixed with the adsorbents and the treated fuel oil is separated from the adsorbents.

9. The method of claim 1 wherein the adsorbents are added to a packed column and the fuel oil contacts the adsorbents in the packed column.

10. The method of claim 1 wherein the solvent is a hydrocarbon having from 1 to 30 carbon atoms.

11. The method of claim 10 wherein the solvent is an alkane having from 1 to 30 carbon atoms or a cycloalkane having from 3 to 30 carbon atoms.

12. The method of claim 11 wherein the solvent is a cycloalkane having from 5 to 8 carbon atoms.

13. The method of claim 10 wherein the solvent is an aromatic hydrocarbon having from 6 to 30 carbon atoms.

14. The method of claim 13 wherein the solvent is tetralin.

15. The method of claim 12 wherein the solvent is a cyclohexane.

16. The method of claim 1 wherein the amount of solvent is from about 10 to about 200 percent by weight based on the weight of the fuel oil.

17. The method of claim 1 wherein the solvent is premixed with the fuel oil before the fuel oil is contacted by the adsorbent.

18. The method of claim 1 wherein the adsorption temperature is from about room temperature up to about 120° C.

19. The method of claim 18, wherein the adsorption temperature is from about 25° C. to about 100° C.

20. The method of claim 1 wherein the amount of adsorbents is from about 1 to about 100 percent by weight based on the weight of the fuel oil.

21. The method of claim 18 wherein the amount of adsorbents is from about 5 to about 50 percent by weight based on the weight of the fuel oil.

* * * * *

UNITED STATES PATENT AND TRADEMARK OFFICE
CERTIFICATE OF CORRECTION

PATENT NO. : 7,967,976 B2  
APPLICATION NO. : 11/622731  
DATED : June 28, 2011  
INVENTOR(S) : Silva et al.

Page 1 of 1

It is certified that error appears in the above-identified patent and that said Letters Patent is hereby corrected as shown below:

In Column 5, Lines 36-37, in Claim 5, delete "aromatic aminosufork" and insert -- aromatic sulfonic --, therefor.

In Column 5, Line 37, in Claim 5, delete "consisting of" and insert -- consisting of: --, therefor.

In Column 5, Line 39, in Claim 5, delete "add)," and insert -- acid), --, therefor.

In Column 5, Line 40, in Claim 5, delete "suifonic" and insert -- sulfonic --, therefor.

Signed and Sealed this
Twenty-fourth Day of January, 2012

David J. Kappos
*Director of the United States Patent and Trademark Office*